(12) United States Patent
Kikukawa et al.

(10) Patent No.: US 8,791,379 B2
(45) Date of Patent: Jul. 29, 2014

(54) SWITCHGEAR

(75) Inventors: Shuichi Kikukawa, Hitachi (JP); Kenji Tsuchiya, Hitachi (JP); Ayumu Morita, Hitachi (JP); Keiichi Takahashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 13/311,587

(22) Filed: Dec. 6, 2011

(65) Prior Publication Data

US 2012/0152716 A1    Jun. 21, 2012

(30) Foreign Application Priority Data

Dec. 20, 2010   (JP) ................................. 2010-282532

(51) Int. Cl.
   *H01H 9/26*   (2006.01)
(52) U.S. Cl.
   USPC .......................................... 200/5 A; 218/140
(58) Field of Classification Search
   USPC .................................. 200/5 A; 218/140, 120
   See application file for complete search history.

(56) References Cited

U.S. PATENT DOCUMENTS

| 6,292,356 B1 | 9/2001 | Yamagiwa et al. |
| 6,556,428 B1 | 4/2003 | Takahoshi et al. |
| 8,237,076 B2 | 8/2012 | Sato |

FOREIGN PATENT DOCUMENTS

| CN | 1528038 | 9/2004 |
| CN | 200953435 | 9/2007 |
| DE | 10 16 794 | 10/1957 |
| DE | 10 2007 045 486 A1 | 5/2008 |
| EP | 1 463 174 | 9/2004 |
| EP | 1 496 585 | 1/2005 |
| JP | 4-76108 | 7/1992 |
| JP | 10-084608 | 3/1998 |
| JP | 2003-299216 | 10/2003 |
| JP | 2009-201274 | 9/2009 |
| JP | 2010-041859 | 2/2010 |
| JP | 2010-044928 | 2/2010 |

OTHER PUBLICATIONS

Fixed-Mounted Circuit-Breaker Switchgear Type NXPLUS C up to 24kV, Gas-Insulated, Siemens HA 35.41 2010.
JP Office Action of Appln. No. 2010-282532 dated Nov. 27, 2012 with partial English translation.
EP Search Report of Appln. No. 11194592.9 dated Jan. 2, 2013 in English.
Chinese Office Action for Chinese Application No. 201110425042.6, issued on Mar. 4, 2014.

*Primary Examiner* — Xuong Chung Trans
(74) *Attorney, Agent, or Firm* — Antonelli, Terry, Stout & Kraus, LLP.

(57) ABSTRACT

It is an object to provide a switchgear capable of alleviating burden to a manager. In order to solve the aforementioned problem, the switchgear according to the present invention includes a plurality of compatible switch units each provided in a housing and closing/interrupting/ground functions so that the plurality of switch units are connected to supply power to the load side.

12 Claims, 11 Drawing Sheets

SWITCHGEAR

CLAIM OF PRIORITY

The present application claims priority from Japanese patent application serial no. 2010-282532, filed on Dec. 20, 2010, the content of which is hereby incorporated by reference into this application.

FIELD OF THE INVENTION

The present invention relates to a switchgear, and more particularly, to a switchgear provided with a plurality of switch units.

BACKGROUND OF THE INVENTION

The switchgear is provided in a reception/distribution system, and receives power from a bus side so as to supply power to a load side from a cable via a breaker.

Fixed-Mounted Circuit-Breaker Switchgear Type NXPLUS C. up to 24 kV, Gas-Insulated Medium-Voltage Switchgear [Catalog HA 35.41 2006, SIEMENS] (Non-Patent Document 1) discloses the generally employed switchgear as a single unit having a plurality of switch units arranged therein. The structure as disclosed in the Non-Patent Document 1 will be described referring to the circuit diagram, FIGS. 10 and 11.

Figure 10:
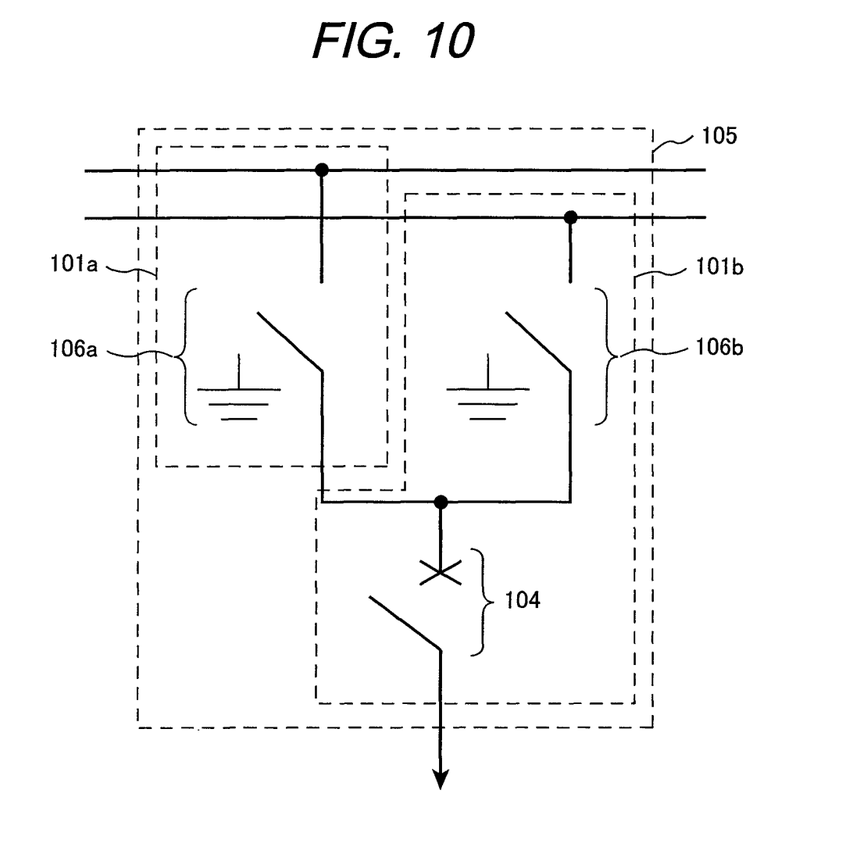
FIG. 10 is a circuit diagram of a switch gear of double bus type as related art.
Figure 11:
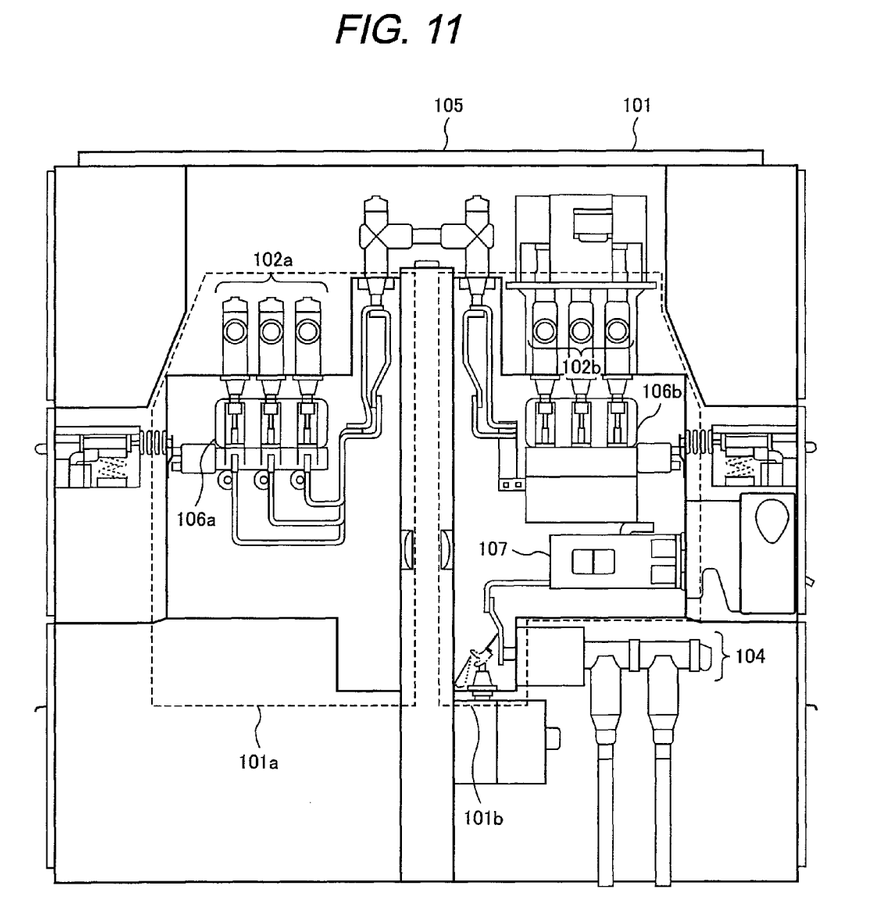
FIG. 11 is a sectional side view of the switchgear of double bus type as related art.

Referring to the circuit diagram shown in FIG. 10 and FIG. 11, a switchgear 101 of double bus type disclosed in the Non-Patent Document 1 is formed by combining a switch unit 101a provided with a bus 102a and a three-position type disconnector 106a that has only disconnection/ground function, and another switch unit 101b provided with another bus 102b, a three-position disconnector 106b that has only disconnection/ground function, and a vacuum breaker 107 in a housing 105.

When any one of the switch units of the above-described switchgear of multi-bus type gets out of order, the switch unit corresponding to the one with the failure part is necessary for replacement. So a plurality of different types of switch units have to be made available as backup, which may make the manager burdened.

It is an object of the present invention to provide a switchgear capable of alleviating the burden of the manager.

SUMMARY OF THE INVENTION

In order to solve the aforementioned problem, the switchgear according to the present invention includes a plurality of compatible switch units that are connected in the housing so as to supply power to the load side.

The present invention may provide the switchgear capable of alleviating the burden to the manager.

DETAILED DESCRIPTION OF THE PREFERRED EMBODIMENTS

Preferred embodiments for carrying out the present invention will be described hereinafter. The following embodiments are mere examples, and the specific description does not intend to restrict the present invention.

Figure 1:
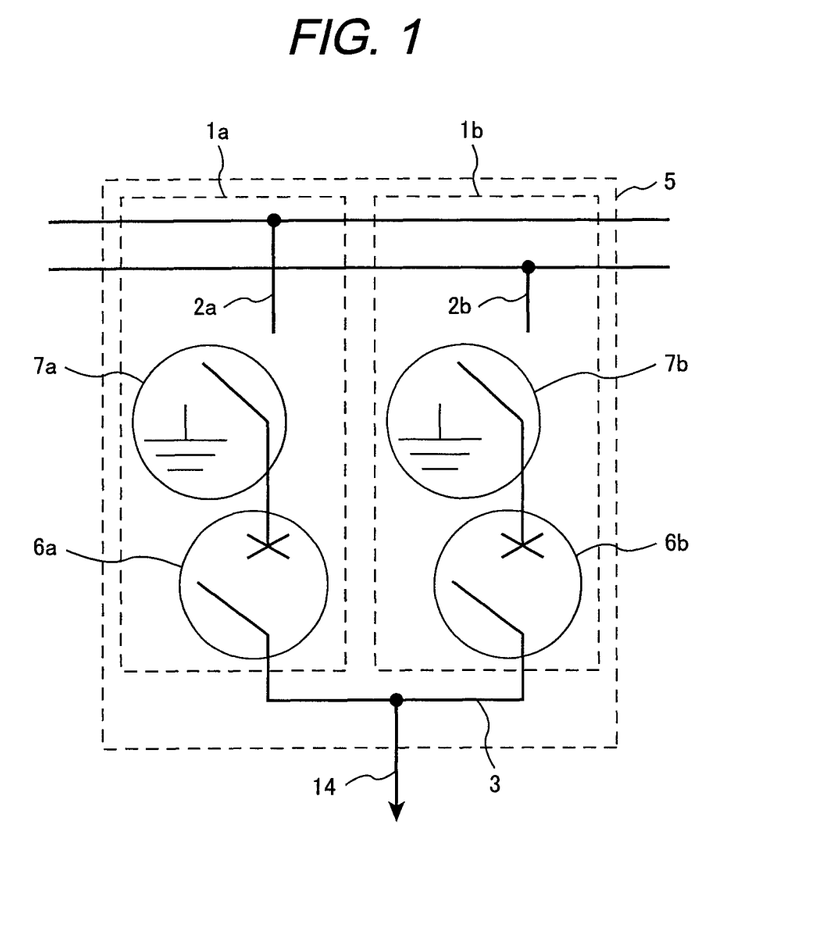
FIG. 1 is a circuit diagram according to each embodiment.

FIG. 1 is a circuit diagram of a switchgear to be described according to the respective embodiments. FIG. 1 only represents one of three phases, and each of the other two phases may be expressed by the same circuit diagram.

A switchgear 1 includes switch units 1a, 1b, a solid insulated conductor 3, and a cable 14 in a metal housing 5. The switch units 1a, 1b are connected by the solid insulated conductor 3 at a load side to which power is supplied via the cable.

The switch units 1a, 1b are provided with vacuum closing/interrupting switches 6a, 6b for switching at contacts in vacuum vessels under vacuum insulated condition, three-position aerial disconnection switches 7a, 7b which are connected to bus sides of the vacuum closing/interrupting switches 6a, 6b for disconnection/grounding under aerial insulated conditions, voltage detectors 8 which are provided at cable sides and measure amounts of power supplied to the load side, bus connection bushings 9 in three phases connected to the bus side for power supply to the vacuum closing/interrupting switches 6a, 6b, and cable connection bushings 10 in three phases connected to the cable side. The vacuum closing/interrupting switches 6a, 6b, the three-position aerial disconnection switches 7a, 7b, the voltage detectors 8, the bus connection bushings 9 and the cable connection bushings 10 are integrally molded through an epoxy resin 11, respectively so that mold switches 1aa, 1ba are formed. The switch units 1a, 1b are connected to the solid insulated conductor 3 at the load side via conductor connection portions 15.

The switch units 1a, 1b further have operation units 12a, 12b for driving the vacuum closing/interrupting switches 6a, 6b and the three-position aerial disconnection switches 7a, 7b, and control units for the operation units, which are arranged therein, respectively.

The solid insulated conductor 3 is connected to the switch units 1a, 1b via the respective cable connection bushings 10 which protrude from the switch unit 1a, 1b.

The solid insulated conductor 3 is provided with a T-type cable connection portion 4 to which the cable connection bushings are rotatably attached, and the cable 14 connected to the T-type cable connection portion 4 for the purpose of supplying power to the load side.

The cable connection portion 4 is T-shaped, which can be connected to the solid insulated conductor 3 rotatably. Each of arrangements according to the embodiments 1 to 5 allows the cable to be pulled through both upper and lower lead-in without changing the layout in the board.

In the embodiment, the switchgear of multi-bus type is formed by providing a plurality of compatible switch units each configured as described above. This makes it possible to alleviate the burden to the manager by eliminating the need of changing the switch unit to be replaced depending on the failure position.

The switchgear is required to block the accident current, and ground the load side in response to sharp voltage fluctuation at the load side for the purpose of stopping the spread of the accident. As described above, the single switch unit is provided with both the interrupter and ground functions. A plurality of compatible switch units may only be provided without requiring the switch units of different types.

The single switch unit may be configured to have the disconnection function, thus improving reliability with respect to surge voltage.

In the embodiment, the switchgear of double bus type will be specifically explained for simplicity because of the highest likelihood of application among those of multi-bus type while omitting the detailed description. However, it is possible to apply the switchgear structure of bus type with three or more bus portions.

Each of the following embodiments realizes the circuit structure as described above to provide the aforementioned effects. Furthermore, arrangement of the switch units for improving convenience of the user in accordance with the usage of the switchgear will be described.

Embodiment 1

Figure 2:
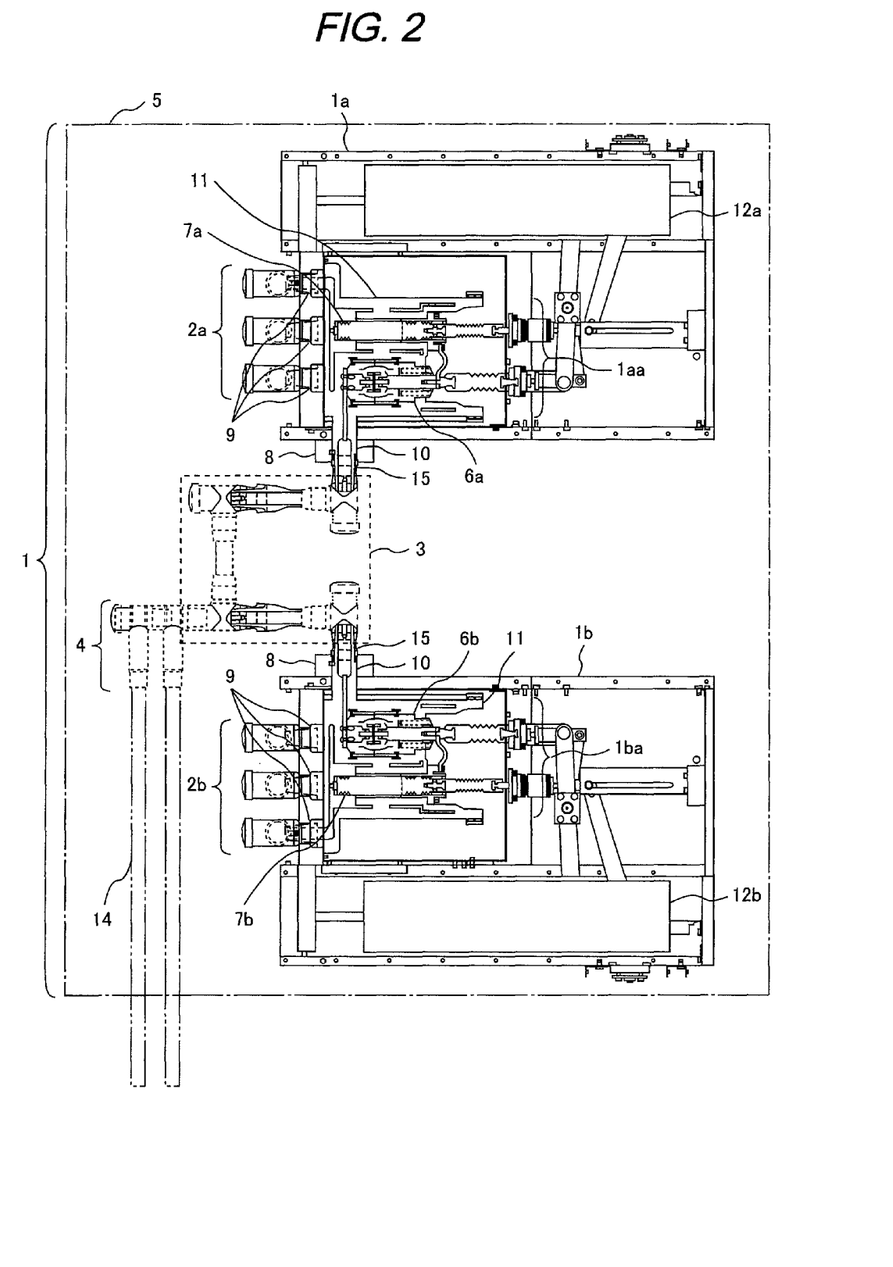
FIG. 2 is a sectional side view of a switchgear according to an embodiment 1.

The first embodiment will be described referring to FIG. 2. The switchgear 1 of vacuum insulation type according to the embodiment includes two switch units 1a, 1b, two bus portions 2a, 2b, the solid insulated conductor 3 for connecting those two switch units 1a, 1b, the cable connection portion 4, and the housing 5 which stores the respective units as described above. The switch units 1a, 1b are vertically arranged in two upper and lower stack stages in parallel at the same side so that the bus portions 2a, 2b are directed to a back surface of the switchgear. The solid insulated conductor 3 is provided between the two switch units 1a and 1b. The cable connection portion 4 is provided closer to the back surface than the solid insulated conductor 3 at the same back side as the bus portions 2a, 2b so that the conductor connection portions 15 of the two switch units face with each other.

In the embodiment, the bus portions 2a, 2b are provided at the back side, and the cable connection portion 4 is also provided at the back side as well. The bus portions 2a, 2b and the cable connection portion 4 which are expected to be connected upon installation on site may be intensively arranged on the back side of the board. This may improve the installation workability on site.

In the embodiment, two switches (three-position aerial disconnection switch and vacuum closing/interrupting switch) are provided in parallel to form a switch unit which is long in its axial direction (longitudinal direction) and short in the direction perpendicular to the longitudinal direction. Assuming that the switch unit is formed into a rectangular parallelepiped which is long in one direction and short in the other direction, a plurality of such switch units are arranged along the short side of the rectangular parallelepiped. As a result, the housing that stores the plurality of switch units and the switchgear may be shaped approximately to the cube, thus reducing the volume. In this way, the plurality of switches are arranged in the stack along the short side (direction perpendicular to the longitudinal direction), ensuring to provide the compact vacuum insulated switchgear.

Embodiment 2

Figure 3:
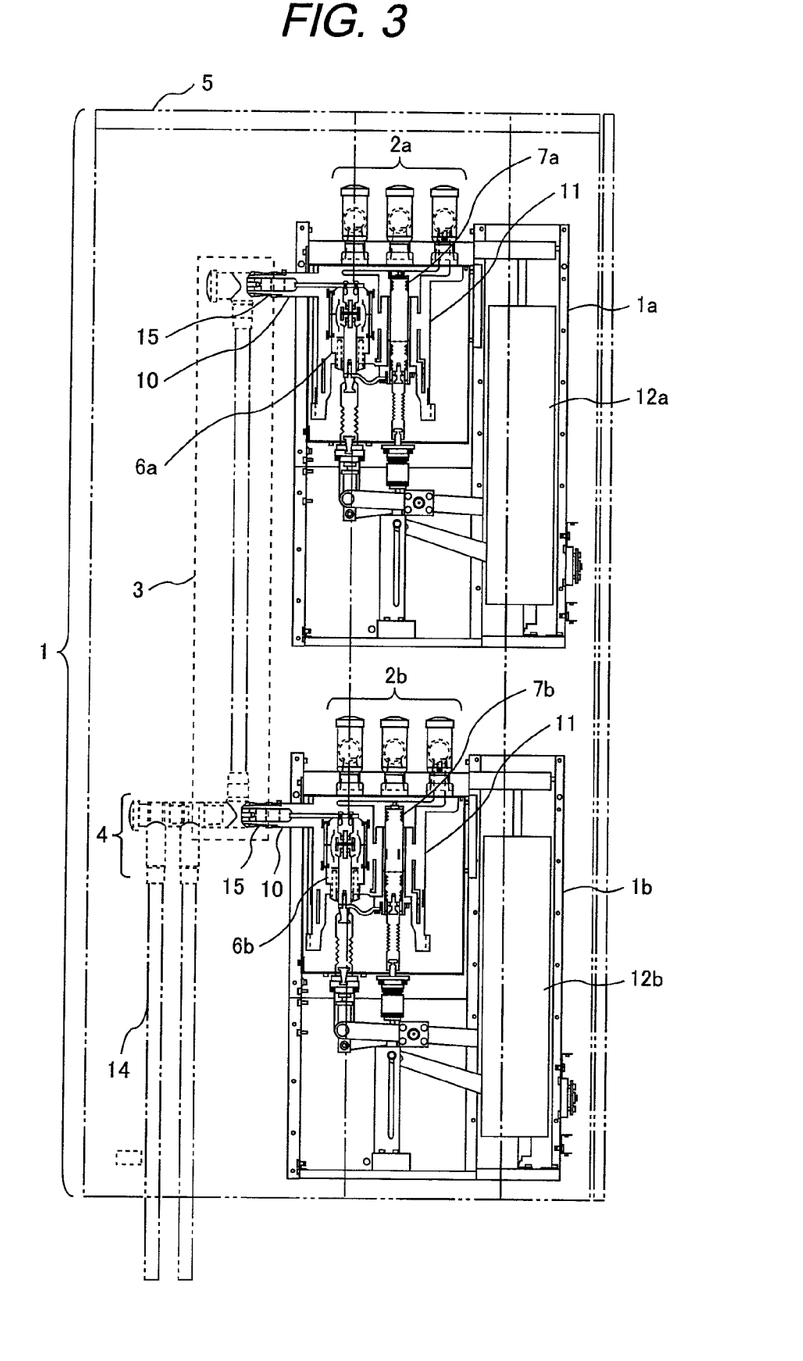
FIG. 3 is a sectional side view of a switchgear according to an embodiment 2.

The second embodiment will be described referring to FIG. 3. The embodiment has a different arrangement of the switch units from that of the embodiment 1. However, the same switch units as those used in the embodiment 1 are employed, and accordingly, the redundant explanation of the switch unit will be omitted.

In this embodiment, the switch units 1a, 1b are arranged in two upper and lower stack stages in the longitudinal direction of the switch units 1a, 1b so that the respective bus connection portions are positioned at the respective tops. The solid insulated conductor 3 is provided between the two switch units 1a, 1b, and the respective conductor connection portions 15 are arranged at the back side of the solid insulated conductor 3. The respective conductor connection portions 15 are arranged in parallel in a plane, and directed to the same side. The conductor connection portions 15 are connected with each another by conductors perpendicular thereto.

In the embodiment, the switch units are longitudinally arranged in the vertical stack, which may increase the height direction of the board, but may minimize its depth. This makes it possible to provide the vacuum insulated switchgear suitable for installation in the electric chamber with small installation area.

The respective conductor connection portions 15 are arranged in parallel in the plane, and directed to the same side. They are connected with each another by the solid insulated conductor 3 perpendicular thereto, thus requiring no adapter for connecting the conductive connection portions 15. This makes it possible to reduce the number of components.

Embodiment 3

Figure 4:
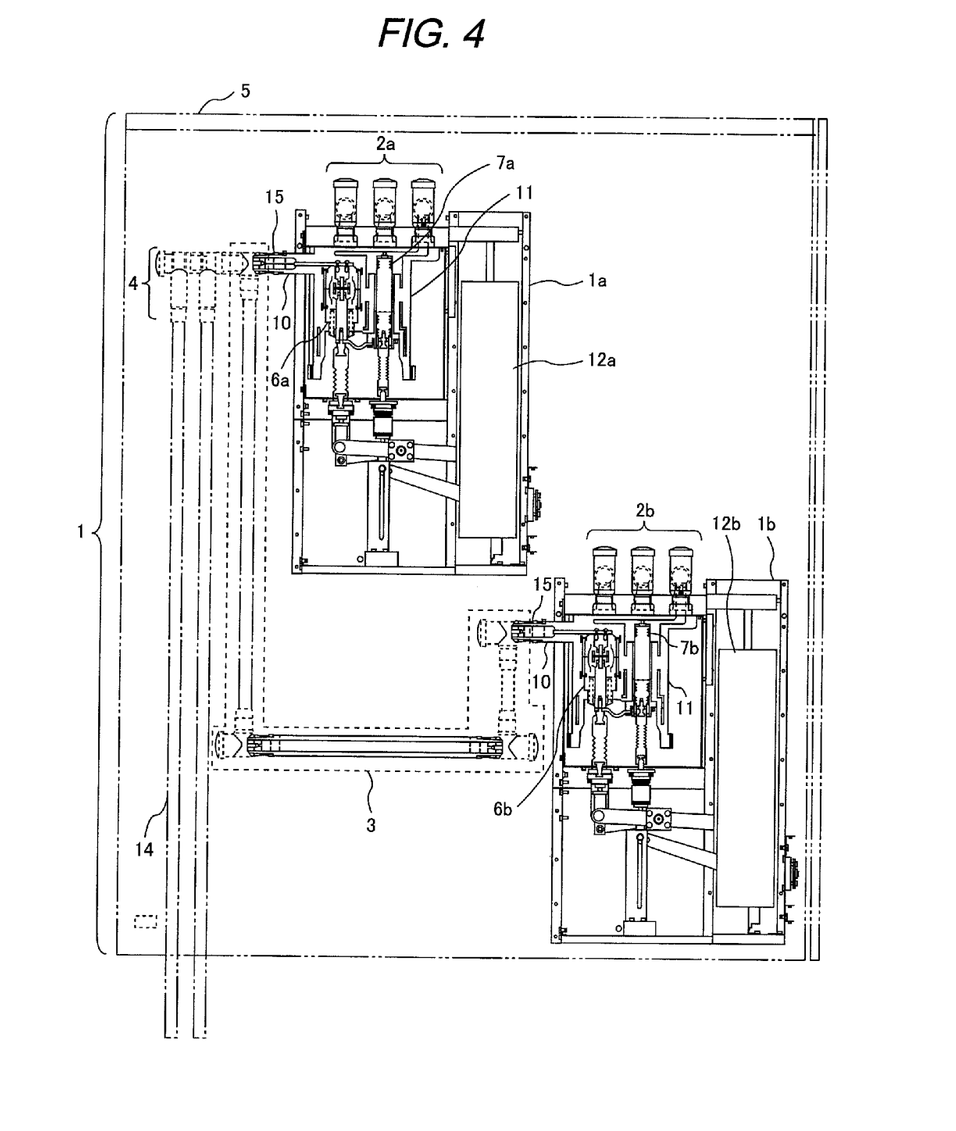
FIG. 4 is a sectional side view of a switchgear according to an embodiment 3.

The third embodiment will be described referring to FIG. 4. The arrangement of the switch units is different from that of the embodiment 1 or 2. However, the same switch unit as that of the embodiment 1 is employed, and accordingly, the explanation of the switch unit will be omitted.

The switch units 1a, 1b are provided at positions where the switch units 1a, 1b are displaced from the longitudinal direction and the direction perpendicular thereto so that the respective bus connection portions of the switch units 1a, 1b are positioned upward of the switchgear. The one at the lower stage side is positioned at the front side of the switchgear, and the one at the upper stage side is positioned at the back side of the switchgear. The solid insulated conductor 3 is provided between the aforementioned two switch units 1a, 1b, and the conductor connection portions 15 are arranged at the back side of the solid insulated conductor 3.

In the embodiment, a plurality of switch units 1a, 1b are arranged at the positions displaced from the longitudinal direction and the direction perpendicular thereto so that the space sufficient to allow access to the respective compartments in the switchgear can be secured in spite of increase in the entire dimension of the switchgear. This makes it possible to provide the vacuum insulated switchgear with excellent service and maintenance performance.

Embodiment 4

Figure 5:
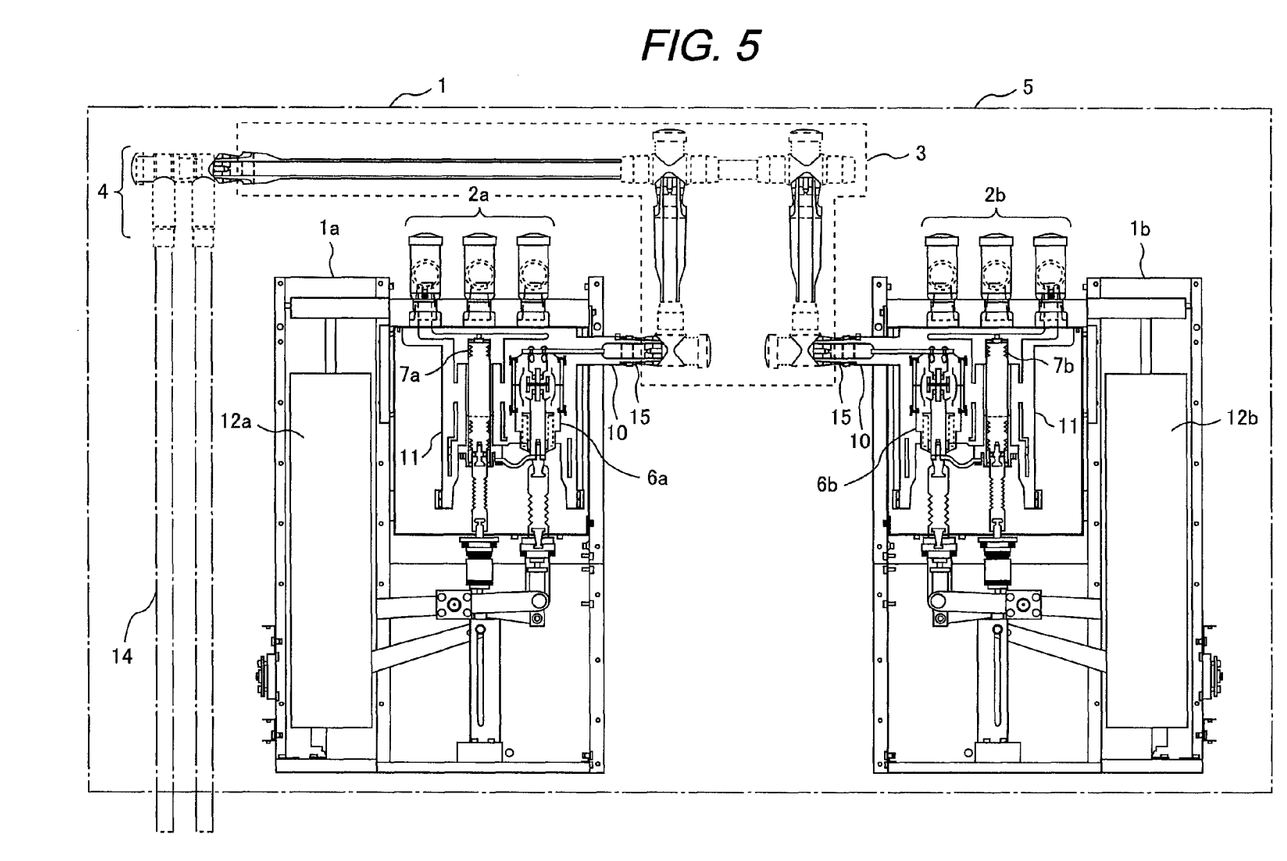
FIG. 5 is a sectional side view of a switchgear according to an embodiment 4.

The fourth embodiment will be described referring to FIG. 5. In the embodiment, the arrangement of the switch units is different from that of the respective embodiments. However, the same switch unit as that of the embodiment 1 is employed, and accordingly the explanation of the switch unit will be omitted herein.

In the embodiment, the switch units 1a, 1b are adjacently arranged on the bottom surface of the switchgear on the same level at the front surface side and the back side of the switchgear so that the respective bus connection portions and the conductor connection portions 15 face across the board center. The solid insulated conductor 3 is provided between the two switch units, and the cable connection portion 4 is arranged at the back side of the solid insulated conductor 3.

In the embodiment, a plurality of switch units are adjacently arranged on the bottom surface of the switchgear so as to minimize the height of the board, and lower the gravity center of the switchgear. This makes it possible to provide the vacuum insulated switchgear suitable for installation in the electric chamber with limited height and in the region required to have seismic capacity. A certain effect may be obtained in terms of seismic capacity by arranging the plurality of switch units at the lower portion, specifically, at the position where the height center of the switch unit becomes half the height of the switchgear or less. The similar effect may be derived from the embodiments 5 and 6 as described below.

The cable connection portion is positioned at the back side of the board, which allows easy cable installation on site.

The respective bus connection portions and the conductor connection portions 15 are arranged to face across the board center, which may intensively arrange the bus portions for installation on site, thus contributing to improved workability.

Embodiment 5

Figure 6:
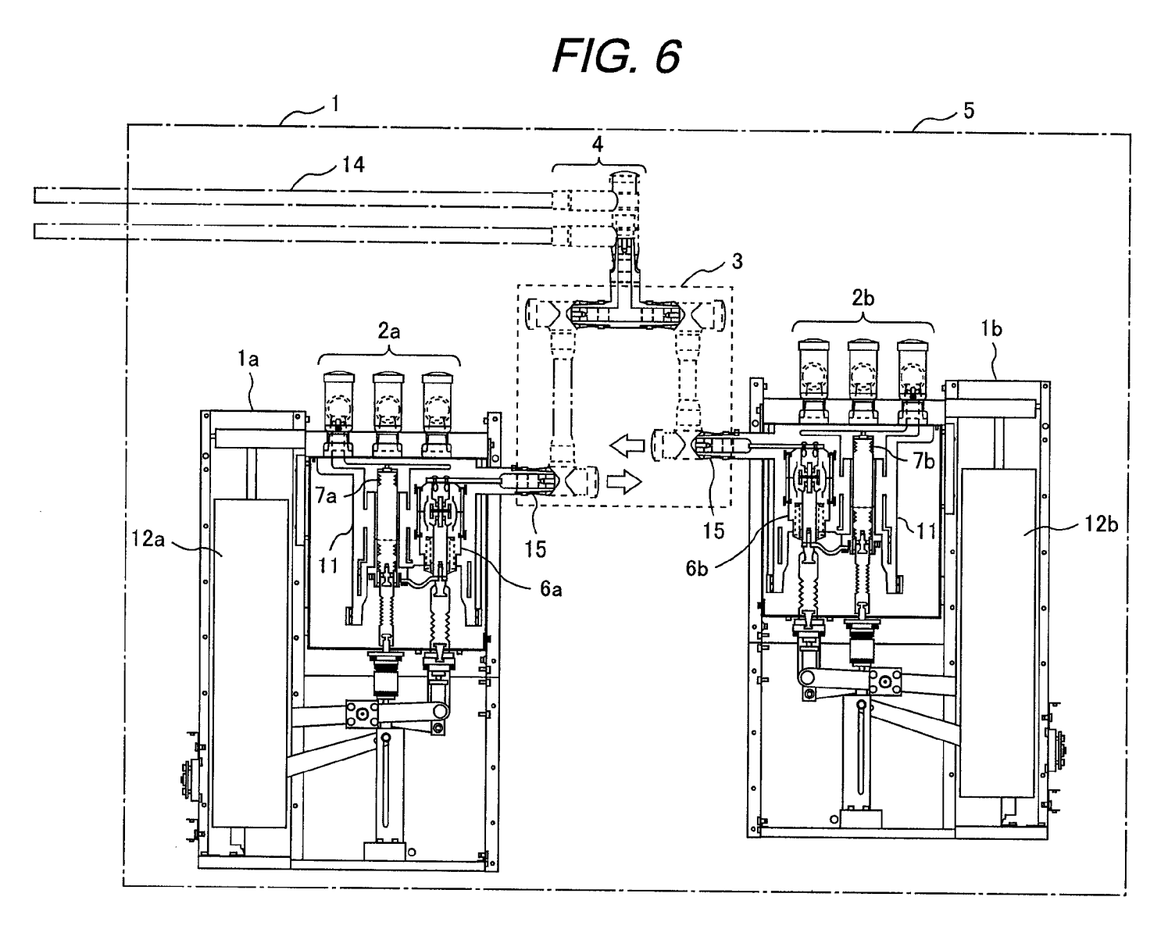
FIG. 6 is a sectional side view of a switchgear according to an embodiment 5.

The fifth embodiment will be described referring to FIG. 6. In the embodiment, the arrangement of the switch units is different from that of the respective embodiments as described above. However, the same switch unit as that of the embodiment 1 is employed, and accordingly, the explanation of the switch unit will be omitted herein.

In the embodiment, the switch units 1a, 1b are arranged at the front side and the back side of the switchgear, respectively so that the respective bus connection portions and the conductor connection portions 15 face across the board center. The solid insulated conductor 3 is provided between the two switch units, and the cable connection portion 4 is provided above the solid insulated conductor 3. A plurality of switch units are adjacently provided at the lower portion of the switchgear on the different level.

Likewise the embodiment 4, this embodiment allows the height of the board to be reduced, and the gravity center of the switchgear to be lowered. It is therefore possible to provide the vacuum insulated switchgear suitable for installation in the electric chamber with limited height and in the area required to have seismic capacity.

Compared to the embodiment 4, the embodiment has the plurality of switch units adjacently arranged at the lower portion of the switchgear on the different level. Even if the dimension in the width direction (lateral direction shown in FIG. 6) is reduced for installation of the conductor connection portion 15, the conductor connection portion 15 of the other switch unit may cause no interference. This may reduce the depth of the switchgear, and accordingly, it is possible to provide the excellent vacuum insulated switchgear suitable for the place where it is difficult to have sufficient space for the electric chamber, which requires reduction in the installation area.

The respective bus connection portions and the conductor connection portions 15 are arranged to face across the board center, which may intensively arrange the positions of the bus portions for installation on site, thus contributing to the improved workability.

Embodiment 6

Figure 7:
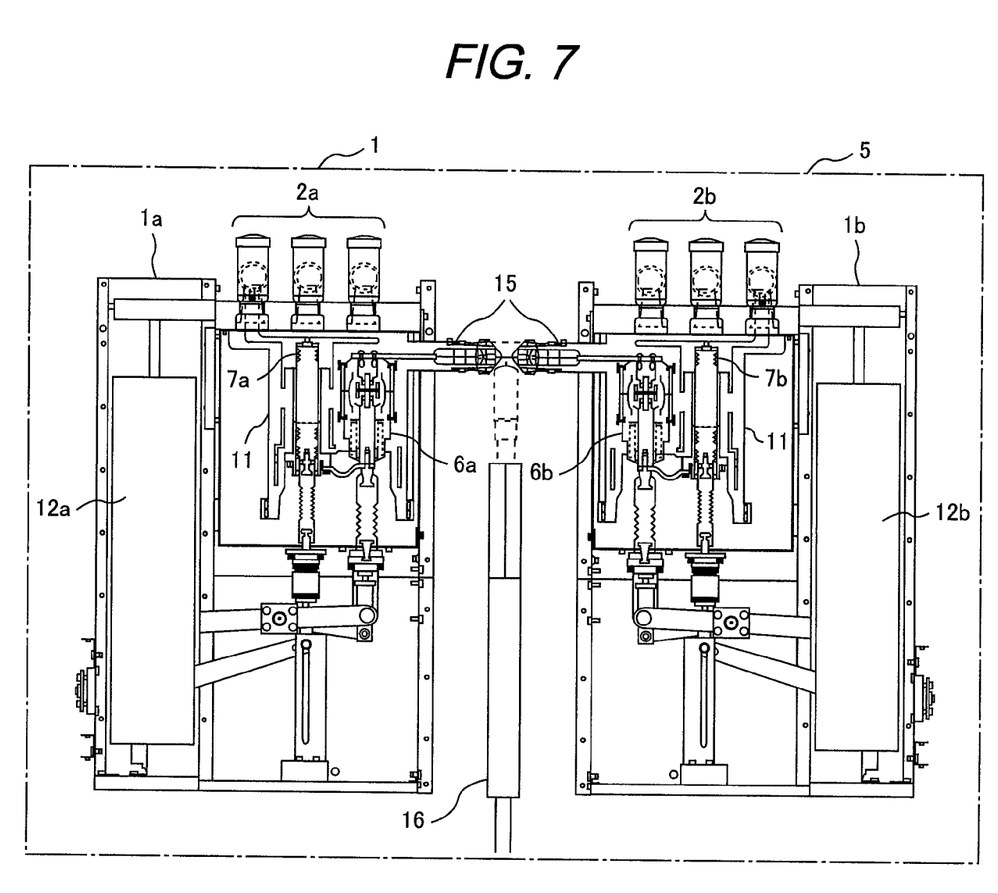
FIG. 7 is a sectional side view of a switchgear according to an embodiment 6.

The sixth embodiment will be described referring to FIGS. 7 to 9. Likewise the arrangement of the switch units according to the embodiment 4 as shown in FIG. 7, the switch units 1a, 1b are adjacently arranged on the bottom surface of the switchgear at its front and back sides, respectively so that the respective bus connection portions and the conductor connection portions 15 face across the board center.

The same switch unit as that of the embodiment 1 is employed herein, and accordingly, the explanation of the switch unit will be omitted.

In the embodiment, the conductor connection portions 15 are adjacently arranged. The solid insulated conductor 3 is not provided between the two switch units, and the conductor connection portions 15 and the cable connection adapter 16 are connected. The plurality of switch units are adjacently arranged at the lower portion of the switchgear on the same level.

Figure 8:
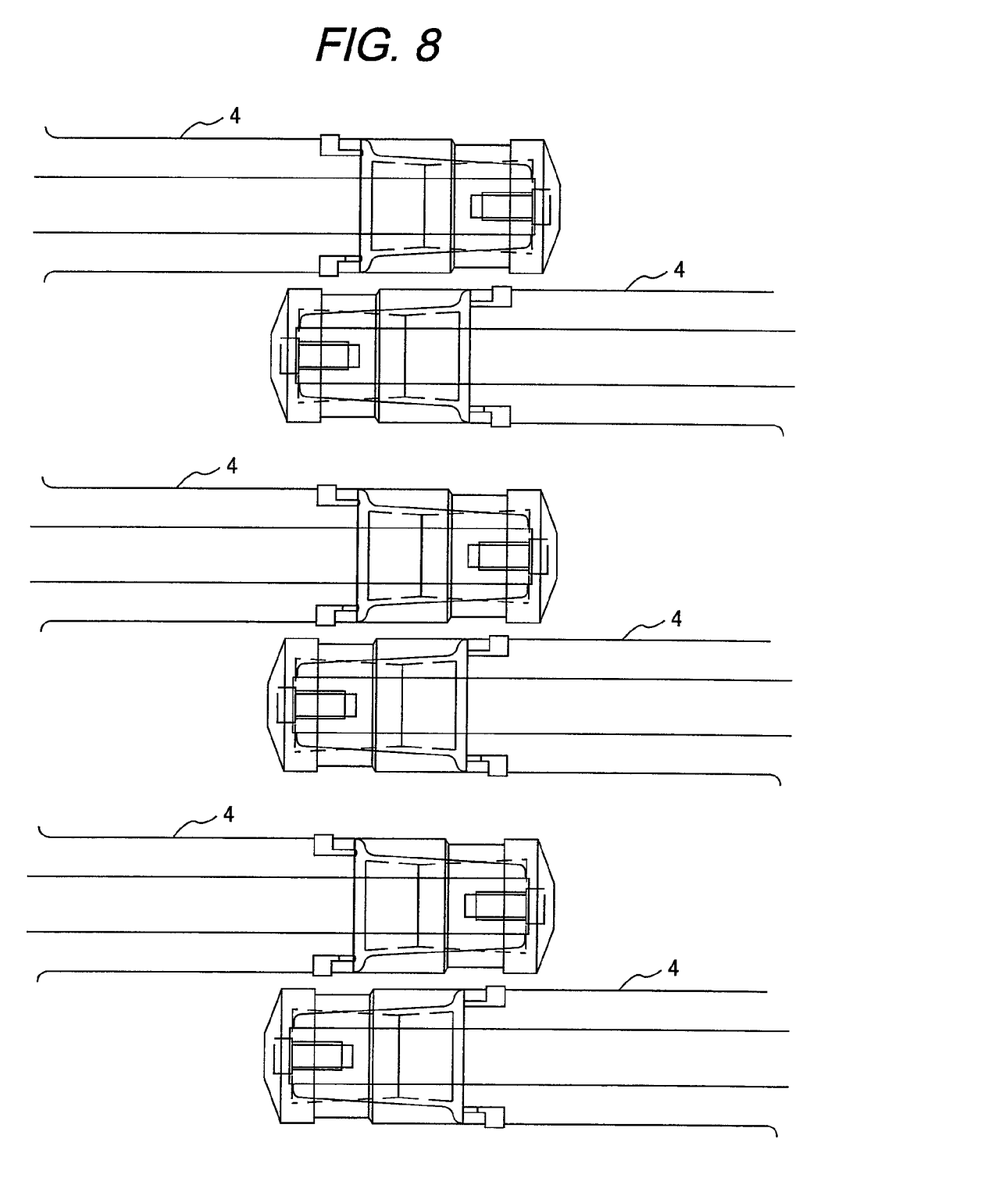
FIG. 8 is a view showing a cable connection portion of a switch unit according to the embodiment 6, when seen from above.

Referring to FIG. 8, the switch units 1a, 1b are arranged so that the cable connection portions are alternately (zigzag) positioned in the board depth direction.

Figure 9:
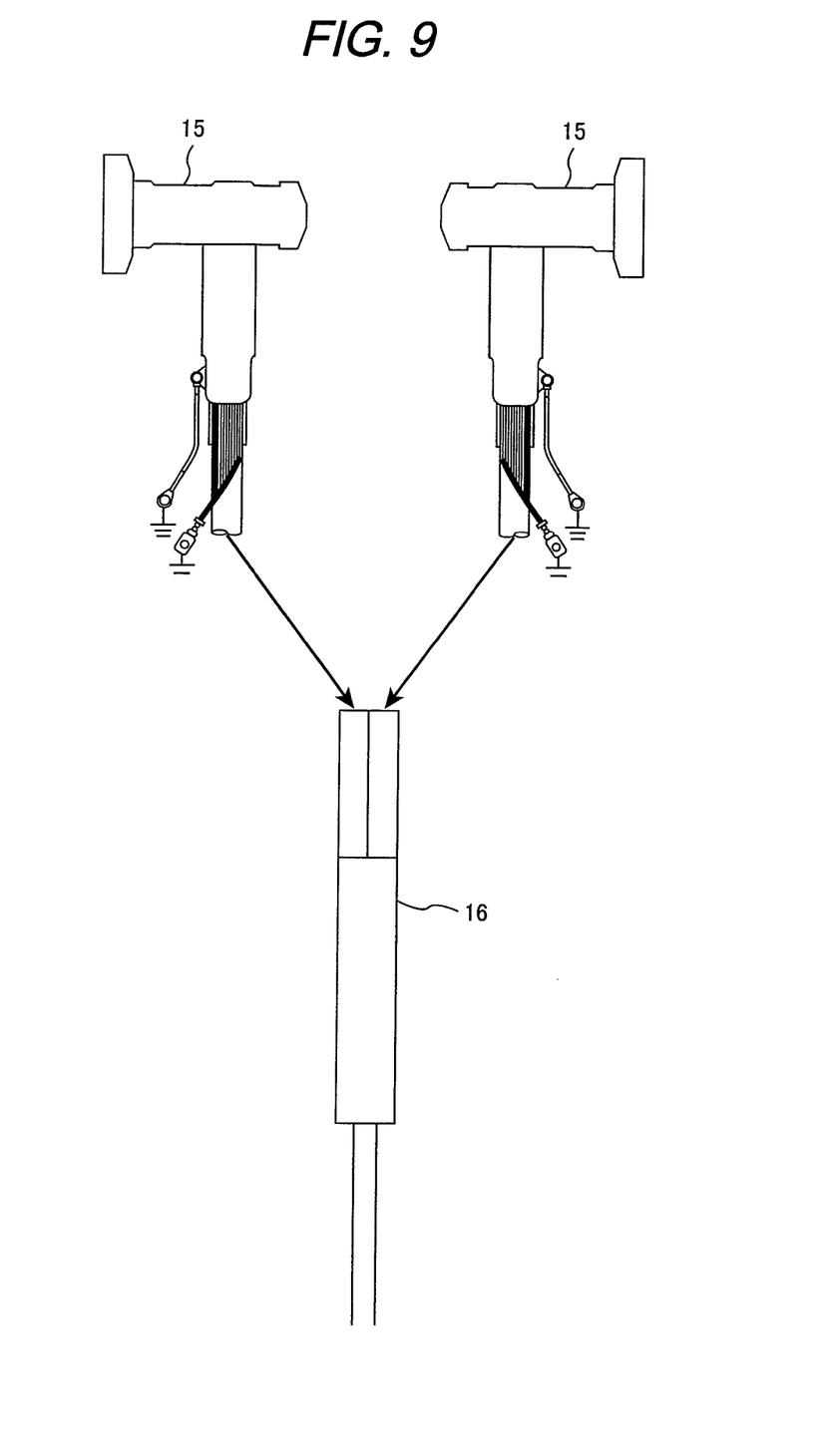
FIG. 9 is a sectional side view of the cable connection portion according to the embodiment 6.

Referring to FIG. 9, cable terminals connected to the switch units 1a, 1b are connected to the single cable via the cable connection adapter 16.

Likewise the embodiment 4, the embodiment has the switch units 1a, 1b adjacently arranged on the bottom surface of the switchgear at its front side and the back side, respectively. This makes it possible to minimize the height of the board and lower the gravity center of the switchgear. It is therefore possible to provide the vacuum insulated switchgear suitable for installation in the electric chamber with limited height and in the area required to have seismic capacity. A certain effect may be obtained in terms of seismic capacity by arranging a plurality of switch units at the lower portion, specifically at the position where the height center of the switch unit becomes half the height of the switchgear or less.

The switch units 1a, 1b are alternately (zigzag) arranged to reduce the depth of the board, aiming at reduction in the installation area.

According to the embodiment, the conductor connection portions 15 are adjacently arranged so that the conductor connection portions 15 and the cable connection adapter 16 are connected, which then may be connected to the cable side without providing the solid insulated conductor 3 between the switch units. This may eliminate the solid insulated conductor 3 for connecting the switch units while being required in the other embodiments, thus aiming at reduction in the number of components. On the premise that the cable connection adapter 16 by itself is a component generally used for constructing the cable by the contractor, it is to be understood that it does not have to be newly manufactured by the switchgear maker. So the number of the components may be reduced, and the work for the cable connection may be easily done on site. Furthermore, the conductor connection portions 15 are adjacently arranged in the embodiment so as to connect the conductor connection portions 15 to the cable connection adapter 16, which ensures connection to the cable side. Arrangement of the switch units on the same level is not an indispensable condition as described herein. The arrangement of the switch units on the same level allows each of the conductive connection portions 15 to have the same structure (no need of length adjustment), thus improving productivity.

What is claimed is:

1. A switchgear comprising:
a double-bus;
a housing; and
two switch units provided in the housing, each of the two switch units including a vacuum insulated switch performing closing and interrupting, an aerial insulated switch connected to a bus side of the vacuum insulated switch and performing grounding, a bus connection bushing in three phases connected to the bus side and supplying power to the vacuum insulated switch, a cable connection bushing connected to a cable side of the vacuum insulated switch, and an epoxy resin integrally molding the vacuum insulated switch, the aerial insulating switch, the bus connection bushing and the cable connecting bushing together, and wherein:
the bus connection bushing provided in each of the two switch units is connected to a different bus of the double-bus from each other, and
the two switch units are electrically connected at a load side of the cable connection bushing with each other.

2. The switchgear according to claim 1,
wherein the aerial insulated switch provided in each of the two switch units further performs grounding.

3. The switchgear according to claim 1,
wherein:
each of the two switch units further includes a conductor connection portion connected to a load side cable;
the bus connection bushing provided in the each of the two switch units is arranged at a back side of the switchgear;
the conductor connection portion provided in each of the two switch units is arranged to face with an other conductor connection portion; and
the bus connection bushing and the load side cable are further arranged at the back side of the switchgear.

4. The switchgear according to claim 3,
wherein the two switch units are arranged in a stack in a direction substantially perpendicular to a longitudinal direction of the switch unit.

5. The switchgear according to claim 1,
wherein:
each of the two switch units further includes a conductor connection portion connected to a load side cable; and
the two switch units are stacked in a longitudinal direction of the switch unit.

6. The switchgear according to claim 5,
wherein the conductor connection portion provided in each of the two switch units is arranged in parallel to an other conductor connection portion at a back side of the switchgear, and is connected to the other conductor connection portion by a conductor substantially perpendicular to the conductor connection portion.

7. The switchgear according to claim 1,
wherein the two switch units are arranged at positions displaced from a longitudinal direction of the switch unit and a direction substantially perpendicular to the longitudinal direction.

8. The switchgear according to claim 1,
wherein the two switch units are adjacently arranged at a lower portion of the switchgear on substantially a same level as each other.

9. The switchgear according to claim 8,
wherein each of the two switch units includes a conductor connection portion connected to a load side cable;
the conductor connection portion provided in each of the two switch units is arranged to face with an other conductor connection portion; and
the conductor connection portion is connected to a common cable connection adaptor.

10. The switchgear according to claim 1,
wherein the two switch units are adjacently arranged at a lower portion of the switchgear on a different level from each other.

11. The switchgear according to claim 10,
wherein each of the two switch units includes a conductor connection portion connected to a load side cable; and
the conductor connection portion provided in each of the two switch units is arranged to face with an other conductor connection portion.

12. The switchgear according to claim 3,
wherein the conductor connection portion is adjacently arranged to the other conductor connection portion.

* * * * *